3,084,101
PARA-HALOGENPHENYL ETHYLSULFONES: CENTRAL NERVOUS SYSTEM DEPRESSANTS

Paul Rumpf and Germaine Thuillier, born Nachmias, Paris, France, assignors to Centre National de la Recherche Scientifique, Paris, France, a corporation of France
No Drawing. Filed Apr. 12, 1960, Ser. No. 21,607
Claims priority, application France Apr. 15, 1959
3 Claims. (Cl. 167—65)

This invention relates to novel para-halogen phenyl ethylsulfones having desirable therapeutic properties, and to methods of preparing the same.

The para-halogen phenyl ethyl sulfones of the invention have the general formula $X\text{—}C_6H_4SO_2C_2H_5$, where X is a halogen atom of atomic mass not higher than 80.

The invention further comprises a method of preparing para-halogen phenylethyl sulfones which comprises esterifying the corresponding para-halogenbenzene sulfinic acid with an ethyl compound.

In the method of the invention, the esterifying step may be carried out by treating an alkali metal salt of the acid with ethyl ester of a mineral acid, especially with diethyl sulfate in an aqueous medium, or with ethyl iodide in pure alcohol.

The initial sulfinic acids may be obtained by chlorosulfonation of the appropriate mono-halogen benzenes followed by reduction of the resulting sulfochlorides, e.g. with sodium sulfite. Another procedure is to fix a molecule of sulfurous acid to a molecule of the halogen benzene in carbon disulfide saturated with hydrochloric acid in the presence of aluminium chloride.

The novel para-halogen phenyl-ethyl sulfones of the invention exhibit marked activity on the central nervous system and are useful as phycholeptic agents, and they include the additional advantageous feature that, in addition to a central depressive action, they exhibit anticonvulsive activity useful in the treatment of epilepsy. They are therefore useful in psychiatry, in the treatment of anxious and agitated patients, especially those suffering from character disorders.

The activity of the para-halogen phenyl-ethyl sulfones is higher and more durable than that of the phenyl-ethyl-sulfones free of a juxtanuclear substituent in the molecule. The potency increases with decreasing atomic weight of the halogen used in para position. The fluorine compound in fact is much the most potent, and since its toxicity is somewhat lower than that of the other two halogen compounds, it has the most favorable therapeutic index and constitutes the preferred compound of the invention.

The tests to be described hereinafter were performed with the fluorine compound used in a dispersion within a mixture comprising 70% water and 20% of the substance polyhydroxyethylene sorbitan mono-oleate, sold by the trade name "Tween 80," by Atlas Powder Company. Acute toxicity was investigated on mice, by intravenous, peroral and intra-peritonal administration, and on rabbits (intravenous process). Chronic toxicity was studied on rats (perorally), and in this latter case the study included establishing the ponderal curve, examination of the blood formula (composition in red corpuscles, hemoglobin and leucocytes) before and after the chronic toxicity tests, and finally an anatomopathological examination of the dead or slaughtered animals.

Acute toxicity ($LD_{50}$) was found to be equal to $320\pm12$ mg. per kilogram of the animal (mice, intravenous injection).

The pharmacological study of the anti-convlusive activity included first a measurement of the degree of protection imparted by the substance to rats exposed to electric shocks 1 second in duration (square pulse current, 80 p.p.s. or 12.5 ms. cycle period, 30 ma. current). The current was applied through bucco-pharyngal and occipital electrodes since this is conducive to maximum tonic attacks with an extension of the rear paws. It was sought to abolish not only the extensive tonic phase but entirely to suppress all convulsive phenomena, so that the animal would only react to the current flow by a body jerk while remaining upright on its paws; this is an especially severe test.

Total suppression of the convlusive attack in the rat, on an average of 100 tests, was obtained when administering 75 mg. of the novel fluorine compound per kilogram animal weight, and the protection obtained lasted two and one half hours. With a dose of 150 mg./kg. the protection time exceeded 6 hours.

The anti-convulsive activity was further investigated by chemical tests including cardiazole induced attacks in rabbits and mice and strychnine-induced attacks in mice.

Further tests were made to investigate the central depressive activity, involving normal animals and animals placed in a condition of permanent agitation by several injections of imino-dipropionitrile, as well as the potentializing of hypnotics. Action on the circulatory, respiratory, and automonous nervous systems were also investigated.

The anti-convulsive properties, specifically suppression of the tonic phase during electrically induced attacks in rats and suppression of the cardiazole induced attacks in mice, of the novel fluorine composition were compared with those of a number of known anti-epileptic drugs, including "phenobarbital" or phenyl-ethyl-malonylurea, "phenytoine" or diphenyl-5.5-hydantoine, "Phenacemide" or phenyl-acetylurea, "Primaclone" or phenyl-5-ethyl-5-hexahydropyrimidine-dione-4,6, "trimethadione" or trimethyl-4.5.5-oxiazolidinedione-2,4, and "Sinforil" or p-chloro-phenyl-methylbutanediol. It was found that, for a toxicity of an equal order of magnitude as that of most of the known anti-epileptic drugs, the novel compound is substantially superior in its polyvalent character, being equally active both against attacks induced by electric shock and by chemicals, as compared to many of the conventional drugs which exhibit activity only in regard to the one or the other type of test.

Moreover, the sedative action of the novel fluorine compound has been compared, with reference to the sedation of waltzing mice, as against the chief tranquilizer or psycholeptic drugs currently used, including "reserpine" or 3,4,5-trimethoxybenzoyl methyl reserpate, "chlorpromazin" or chlor-3-γ-dimethylamino-propyl-10-phenothiazine hydrochloride, "hydroxyzine" or p-chlorbenzhydryl-1-(hydroxy-2″-ethoxy)-2′-ethyl-4-diethyldiamine hydrochloride, "Procalmodiol" or methyl-2-n-propyl-2-propanediol-1,3-di-carbamate, and methyl-3-pentyne-ol-3-carbamate. The novel compound of the invention has revealed greater potency at lower doses than the last two comparison compounds mentioned above.

Clinical study so far conducted has proved favorable, especially in regard to epileptics and anxious and agitated patients suffering from characterial disorders. The fluorinated compound was given orally in tablets containing 100 mg. active substance, at a rate of 2 to 5 tablets a day.

Two examples will now be given to illustrate the preparation of the para-halogen phenyl ethylsulfones according to the invention.

Example 1

A suspension containing 140 g. aluminium chloride in 100 g. fluorbenzene was cooled to about $+5°$ C. and diluted with 250 cc. carbon disulfide. A stream of hydrochloric acid gas was discharged through the suspension until saturation. While maintaining a temperature not higher than 10° C. sulfurous anhydride was slowly added until the aluminium chloride was converted into a brown oily mass, which occurred after 6 or 7 hours. Then the mixture was allowed to stand about 12 hours. The oily layer then crystallized.

The carbon sulfide was evaporated, 1 liter ice-cool water added to decompose the residual complex, and caustic soda solution was added to bring the pH to a highly alkaline value.

The resulting suspension was heated in a water-bath for about one hour. It was then filtered and carbonic acid gas was passed through the filtrate to precipitate out the alumina. The solution was again filtered and concentrated until the sodium p-fluorobenzene sulfinate commenced to crystillize. The mixture was cooled, drained, and the salt was dried to 80° C. under a reduced pressure of about 18 mm. Hg. An amount of 160 grams of dry salt was thus recovered.

This salt was then placed in suspension in 600 cc. absolute ethyl alcohol to which 160 g. ethyl iodide had been added. The suspension was heated at reflux for about 10 hours, the resulting sodium iodide drained and the alcohol removed in vacuo. By distillation at a reduced pressure of 18 mm. Hg, 100 g. of the desired p-fluoro-phenyl-ethyl-sulfone were obtained.

Prior to this distillation, the residue obtained after removal of the alcohol may be taken up with water and ether, a 2% aqueous solution of sodium hyposulfite may be added with stirring in case the solution remains coloured, the sulfone-containing ether phase may be dried over sodium sulfate, and then the ether removed by distillation.

The p-fluorophenyl ethyl-sulfone obtained has a melting point of 41° C.

Applying the same procedure as that described above to chlorbenzene or brombenzene rather than to the fluorbenzene described, there are readily obtained, respectively, the p-chlorphenyl ethylsulfone and the p-bromphenyl ethylsulfone, having the respective melting points of 43° C. and 67° C.

*Example II* p-Halogenphenyl-ethylsulfones and specially the chlorinated sulfone can be produced somewhat more easily by the following procedure.

112.5 g. of chlorobenzene are poured dropwise into 300 g. sulfuric chlorhydrine. The temperature is initially reduced to moderate the reaction, then is raised for two hours to 60° C. The product is then poured into crushed ice, is drained dry and added into a solution containing 312 g. anhydrous sodium sulfite per liter of water. Mechanical agitation is applied for two hours at 20° C. and an alkaline pH value is maintained by adding soda lye from time to time. The mixture is filtered and acidified to precipitate the p-chlorbenzene sulfinic acid (M.P. 95° C.). 100 g. are obtained of this acid. This is immediately neutralized by addition of caustic soda and is converted into sodium p-chloro-benzene sulfinate.

300 g. of the sodium salt thus obtained were treated with 1 kg. ethyl sulfate and vigorously agitated. A 30% soda solution was added at a rate such as not to exceed a temperature of 40° C. in the mixture. Agitation was continued until crystallization of the sulfone. Heating to reflux was continued another two hours, then the mixture was filtered and recrystallized in water. The yield was 260 g. of p-chlorophenyl ethylsulfone, melting point 43° C.

What we claim is:

1. A composition of matter useful in the treatment of convulsive and psycholeptic disorders which contains as the active ingredient therein a compound having the formula $$X-C_6H_4-SO_2-C_2H_5$$

wherein X is a halogen atom selected from the group consisting of fluorine, chlorine and bromine, in a dosage unit amount from about 75 to 332 mg., in a physiologically compatible carrier.

2. A method of treating convulsive and psycholeptic disorders which comprises administering a compound having the formula $$X-C_6H_4-SO_2-C_2H_5$$

wherein X is a halogen atom selected from the group consisting of fluorine, chlorine and bromine.

3. A method of treating convulsive and psycholeptic disorders which comprises administering a compound having the formula $$F-C_6H_4-SO_2-C_2H_5$$

References Cited in the file of this patent

UNITED STATES PATENTS

| | | |
|---|---|---|
| 2,207,021 | Martin et al. | July 9, 1940 |
| 2,573,580 | Ladd | Oct. 30, 1951 |
| 2,825,744 | Smedslund | Mar. 4, 1958 |
| 2,854,379 | Fancher | Sept. 30, 1958 |
| 2,870,215 | Davis et al. | Jan. 20, 1959 |
| 2,872,374 | Beiler et al. | Feb. 3, 1959 |

OTHER REFERENCES

Merritt, Archives of Neurology and Psychiatry, vol. 54, No. 5, pp. 319–322.

Modern Drug Encyclopedia, 7th ed., 1958, pp. 218 and 422.

De Barry, Inorganic Chemistry, Longmans, Green and Co., 1953, p. 458.

Noller, Chem. of Org. Comp., 1951, pp. 273–4.

Beilstein, Band 6, 1923, p. 297.

Beilstein, Band XXIX, 1939, p. 421.

Beilstein, Band 6, 1944, pp. 297 and 301.

UNITED STATES PATENT OFFICE
CERTIFICATE OF CORRECTION

Patent No. 3,084,101            April 2, 1963

Paul Rumpf et al.

It is hereby certified that error appears in the above numbered patent requiring correction and that the said Letters Patent should read as corrected below.

Column 1, line 35, for "phycholeptic" read -- psycholeptic -- column 2, line 26, for "automonous" read -- autonomous --; line 55, for "methyl-3-pentyne-ol-3-" read -- methyl-3-pentyne-1-ol-3- --.

Signed and sealed this 29th day of October 1963.

(SEAL)
Attest:
ERNEST W. SWIDER

EDWIN L. REYNOLDS

Attesting Officer

Acting Commissioner of Patents